Oct. 17, 1961  R. R. LEFFLER ET AL  3,004,560
PULSATION DAMPENER DEVICE AND MANDREL FOR USE THEREIN
Filed Jan. 8, 1959
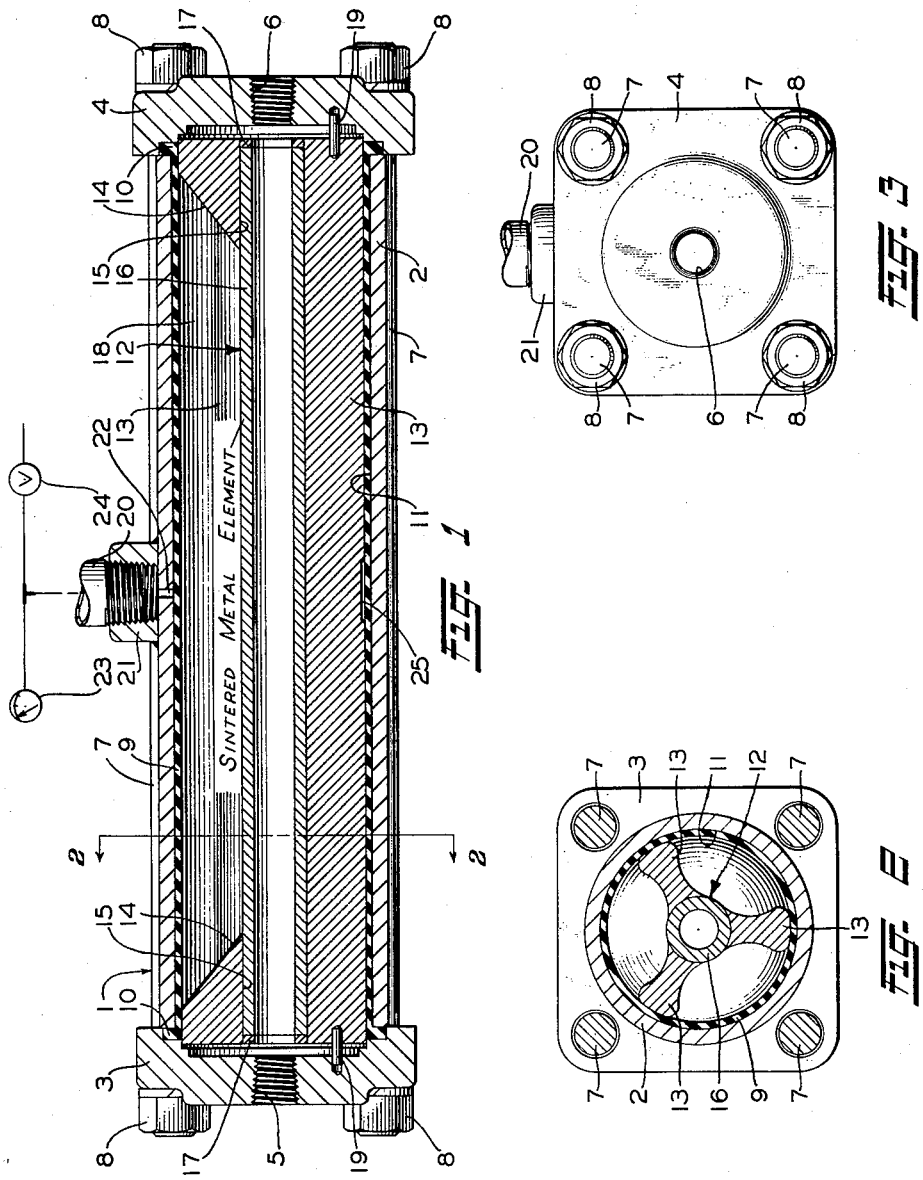
INVENTOR.
Ralph R. Leffler
BY Homer G. Knight
Adelbert A. Steinmeier
Attorney

3,004,560
PULSATION DAMPENER DEVICE AND MANDREL FOR USE THEREIN

Ralph R. Leffler, Trafford, and Homer A. Knight, Pittsburgh, Pa., assignors to Westinghouse Air Brake Company, Wilmerding, Pa., a corporation of Pennsylvania
Filed Jan. 8, 1959, Ser. No. 785,628
1 Claim. (Cl. 138—30)

This invention relates to pulsation dampeners of the type including a resilient sleeve concentrically arranged about a tubular perforated mandrel for absorbing fluid pressure surges in a fluid pressure conveying conduit and more particularly to an improved pulsation dampener employing a novel mandrel including a tubular element of porous metal having such perviousness as to provide throttled passage for fluid therethrough while preventing extrusion of a resilient sleeve into the pores of the tubular element.

In pulsation dampening devices of the above type, of which that shown in U.S. Patent No. 2,712,831, issued July 12, 1955 to G. A. Day is typical, the resilient sleeve surrounding the mandrel is subject to a fluid pressure contained in a chamber on the outside of the sleeve. Upon a sudden decrease of pressure of fluid in the conduit, the resilient sleeve is pressed by the fluid pressure in the chamber on the outside of the sleeve against the outer surface of the mandrel and, in the course of time, becomes extruded into the orifices in the mandrel, thus causing destructive cutting and abrading of the sleeve, and correspondingly limiting the service life of the device. Various solutions to this problem intended to lengthen the service life of the expansible rubber sleeve have been proposed such as rounding the edges of the orifices or providing baffle arrangements on the mandrel.

According to this invention, a pulsation dampener device of the hereinbefore-mentioned type is provided with a novel form of mandrel including a tubular element of sintered metal, the pores of which are of such degree of perviousness as to provide throttled passage of fluid therethrough while at the same time being so minute that when the sleeve is pressed into contact with the outer surface of the tubular element as a result of reduction of pressure of fluid within the mandrel, the rubber sleeve will not be extruded into the pores of the tubular element.

In the accompanying drawing, FIG. 1 is a longitudinal sectional view of a pulsation dampener showing the improved form of mandrel; FIG. 2 is a cross-sectional view taken along the line 2—2 of FIG. 1; and FIG. 3 is an end view of the improved pulsation dampener device.

Description

Referring to the drawing, the improved pulsation dampener device 1 embodying the invention, comprises a sectionalized casing having a hollow cylindrical casing member 2 clamped at its outer ends between end caps 3 and 4 having respective threaded axial bores 5 and 6 therethrough to which the threaded end of a fluid inlet and a fluid outlet pipe, respectively, of a variable fluid pressure conveying conduit (not shown) can be connected.

End caps 3 and 4 are held in clamped relation by any suitable means such as by a plurality of longitudinal rods 7 which have threaded end portions and by nuts 8 which have screw-threaded connection with the threaded end portions of rods 7; rods 7 being disposed in spaced relation exteriorly of the sectionalized casing.

A resilient sleeve 9 with outwardly directed end flanges 10 seated in respective annular grooves formed in the inner faces of end caps 3 and 4 is coaxially disposed within a bore 11 of the casing member 2 and is sealingly clamped at its flanged ends between the ends of casing member 2 and the inner faces of end caps 3 and 4. The outer diameter of sleeve 9 conforms closely to the diameter of bore 11 in casing member 2 for a reason to be hereafter made apparent.

Disposed between end caps 3 and 4 and coaxially within sleeve 9 is a mandrel 12 including a support member or spider, illustratively shown as having three longitudinally extending ribs 13 arranged in circumferentially-spaced relation about the longitudinal axis of the mandrel. Each rib 13 has concave side walls that connect at their upper ends with a longitudinal lobe formed at the outer edge of the rib. The outer edge of the rib 13 contacts the inner surface of resilient sleeve 9 in supporting contact. At their respective outer ends ribs 13 are connected, as by welding, to end cones 14 which taper inwardly. Each cone 14 is provided with an axial bore 15 therethrough respectively aligned with bores 5 and 6 of end caps 3 and 4. Cones 14 have cylindrical surfaces thereon that sealingly engage the inner surface of sleeve 9 at its outer flanged ends.

Mandrel 12 further comprises a tubular element 16 of sintered metal which extends centrally through the spider in parallel relation to and inwardly of the longitudinal ribs 13, the opposite ends thereof being supported in close fitting relation in the bores 15 of respective opposite end cones 14. If desired, element 16 may be retained within the bores of the cones 14, as illustrated in the drawing, by retainer rings 17 disposed at opposite ends of element 16 and press fitted into the bores 15 after installation of the tubular element. The sintered metal of tubular element 16 is of such porosity or degree of perviousness as to provide throttled passage of fluid in either direction between the inside of the tubular element 16 and longitudinal fluid pressure chambers 18 formed between sleeve 9, ribs 13 of mandrel 12, and the tapered areas of end cones 14.

Pins 19 may be provided at each end of mandrel 12 for anchoring the mandrel against possible rotational shifting within the sleeve 9.

To provide a cushioning force on the outer surface of sleeve 9 fluid under pressure may be introduced into the space between the outer surface of sleeve 9 and the bore 11, as through a supply pipe 20 connected to a fitting 21 welded on the casing member 2, and a port 22 through the wall of member 2. Pipe 20 may be provided with a pressure gauge 23 and a valve 24 for admitting or for closing off the flow of fluid under pressure to device 1 when the pressure of fluid reaches a predetermined desired value.

To facilitate the flow of fluid under pressure to all areas of the outer surface of sleeve 9, the lobes of ribs 13 have transverse depressions 25 which allow the resilient sleeve 9 to be pressed thereinto by the pressure of fluid acting on the outside of sleeve 9.

In the operation of the improved pulsation dampener device 1 prior to use resilient sleeve 9 will be in the position shown in FIGS. 1 and 2 substantially in contact with bores 11 of member 2. Preferably, before connecting device 1 to a variable fluid pressure conduit, device 1 is pre-charged with fluid under pressure by opening valve 24 and permitting a predetermined amount of fluid under pressure to flow to the outer surface of resilient sleeve 9 via port 22. Fluid under pressure acting on resilient sleeve 9 will compress sleeve 9 into depressions 25 and fluid will thus be distributed with greater facility to all areas of the outer surface of sleeve 9. Sleeve 9 will thus be pressed inwardly against ribs 13, and portions of sleeve 9 intermediate ribs 13 will be forced inwardly to form longitudinal chambers charged with fluid under pressure.

In order to prevent stretching of resilient sleeve 9, the configuration of the mandrel 12 is such that when the sleeve 9 is collapsed on the mandrel the contact area between the sleeve 9 and the mandrel 12 is approximately the same.

Assume now that device 1 is connected at bores 5 and 6 to fluid inlet and fluid outlet pipes respectively of a variable fluid pressure conveying conduit. When device 1 is thus coupled to the conduit, then fluid under pressure will flow through the tubular element 16 and also through the pores in the wall of tubular element 16 and into the longitudinal fluid pressure chambers 18 to act upon the inner surface of resilient sleeve 9 to tend to force sleeve 9 outwardly against the force of pressure of fluid acting in the longitudinal pre-charged chambers on the outside of sleeve 9.

Upon a sudden surge of pressure of fluid in the conduit such as is characteristic of conduits connected to reciprocating, centrifugal, or rotary pumps, the pressure of fluid flowing through the tubular element 16 will flow through the pores of the tubular element 16 and will act against the pressure of fluid in the pre-charged chambers acting on the outside of the sleeve to cause the sleeve 9 to expand toward the wall of bore 11 of cylindrical member 2, and depending on the magnitude of the surge, into contact with the wall of bore 11.

But, if there is a sudden decrease of pressure in the conduit, the sleeve 9 will be pressed against the mandrel 12 and sintered element 16 by the preponderant force of pressure of fluid in the pre-charged chambers. However, as a consequence of the minute dimension of the pores of element 16, the latter inherently provides a surface for supporting sleeve 9 without extrusion of the sleeve into the pores of the element 16, thus preventing abrading and cutting of the sleeve 9.

Having now described the invention, what we claim as new and desire to secure by Letters Patent is:

In a fluid pulsation device for absorbing pressure surges in a conduit conveying fluid at fluctuating pressures including a cylindrical casing having an inlet and outlet connectable in the conduit, a resilient sleeve in said casing adjacent the inner wall thereof and defining between the inner wall and said sleeve a gas chamber into which gas may be introduced at a predetermined pressure relative to the average pressure of the fluid in the conduit; the improvement comprising a spider member having a pair of spaced end portions of substantially circular cross section and a plurality of spaced radial ribs formed integral with and extending longitudinally between the opposed faces of said end portions, said end portions sealingly engaging the sleeve against said inner wall of said casing, an open-end bore axially extending through said spider member, and a rigid hollow tubular element in said bore for providing communication between the inlet and outlet and being supported in said end portions and contacting the inner ends of said radial ribs along spaced longitudinal extending circumferential areas to provide circumferential surfaces exposed to the interior of said sleeve, said spaced ribs and said exposed surfaces of said tubular element and said sleeve defining a pressure absorbing chamber, said tubular element being of sintered metal having pores of a perviousness serving as throttling orifices for the fluid flow between said tubular element and said pressure absorbing chamber and through said exposed surfaces, and said pores further being of such minute character to prevent extrusion of the resilient sleeve into said pores when the resilient sleeve is pressed against said exposed surfaces of said tubular element when the pressure of fluid in the gas charged chamber greatly exceeds the pressure of fluid in the pressure absorbing chamber upon a sudden reduction of the pressure of fluid in the conduit.

References Cited in the file of this patent

UNITED STATES PATENTS

| | | |
|---|---|---|
| 2,515,394 | Clarkson | July 18, 1950 |
| 2,760,518 | Peet | Aug. 28, 1956 |
| 2,867,240 | Bent | Jan. 6, 1959 |